United States Patent [19]

LeFebvre et al.

[11] 4,047,382
[45] Sept. 13, 1977

[54] THRUST MANAGEMENT CONTROL PROPULSION SYSTEM

[75] Inventors: Clarence A. LeFebvre, San Jose; Joseph M. Cabezut, Jr., Sunnyvale, both of Calif.

[73] Assignee: The United States of America as represented by the Secretary of the Army, Washington, D.C.

[21] Appl. No.: 619,153

[22] Filed: Oct. 3, 1975

[51] Int. Cl.² .............. F02K 9/04; F16K 31/126
[52] U.S. Cl. ...................................... 60/252; 60/258; 251/63.5; 251/120; 251/332; 251/340
[58] Field of Search ............... 60/252, 258, 39.74 A; 251/63.5, 340, 120, 332; 222/485, 501, 525

[56] References Cited

U.S. PATENT DOCUMENTS

| | | | |
|---|---|---|---|
| 2,810,259 | 10/1957 | Burdett | 60/39.74 A |
| 3,064,903 | 11/1962 | Butler | 60/258 |
| 3,098,625 | 7/1963 | Thielman | 60/252 |
| 3,126,701 | 3/1964 | Henderson et al. | 60/252 |
| 3,131,906 | 5/1964 | King | 251/332 |
| 3,158,994 | 12/1964 | Hodgson | 60/252 |
| 3,173,252 | 3/1965 | Ziegenhagen | 60/252 |
| 3,232,049 | 2/1966 | Rhodes | 60/39.74 A |
| 3,349,563 | 10/1967 | Taylor et al. | 60/252 |
| 3,908,364 | 9/1975 | LeFebvre et al. | 60/252 |

Primary Examiner—Carlton R. Croyle
Assistant Examiner—Robert E. Garrett
Attorney, Agent, or Firm—Nathan Edelberg; Robert P. Gibson; Charles R. Carter

[57] ABSTRACT

A control system for supplying uncured propellant into the combustion chamber of a missile. The system includes a moving injector cooperating with a pressurized putty-like uncured propellant. This combination provides the missile with a propulsion system having rapid wide range throttling, shut off and restart capabilities.

1 Claim, 4 Drawing Figures

THRUST MANAGEMENT CONTROL PROPULSION SYSTEM

DEDICATORY CLAUSE

The invention described herein was made in the course of or under a contract or subcontract thereunder with the Government and may be manufactured, used, and licensed by or for the Government for governmental purposes without the payment to us of any royalties thereon.

SUMMARY OF THE INVENTION

It is desirable in a missile propulsion system to provide the propulsion system with rapid wide range throttling, shut off and restart capability. The present invention has provided this capability through the use of a moving injector in combination with a complete propulsion system. A warm gas generator provides the force necessary to squeeze the putty-like propellant through a variable area annular moving injector. The injector cooperates with a seat to control the amount of propellant flowing into the combustion chamber. Shut off is accomplished by closing the injector against a rubber flow seal in the seat.

This invention may be better understood from the following detailed description taken in conjunction with the accompanying drawing.

DESCRIPTION OF THE PREFERRED EMBODIMENT

Figure 1:
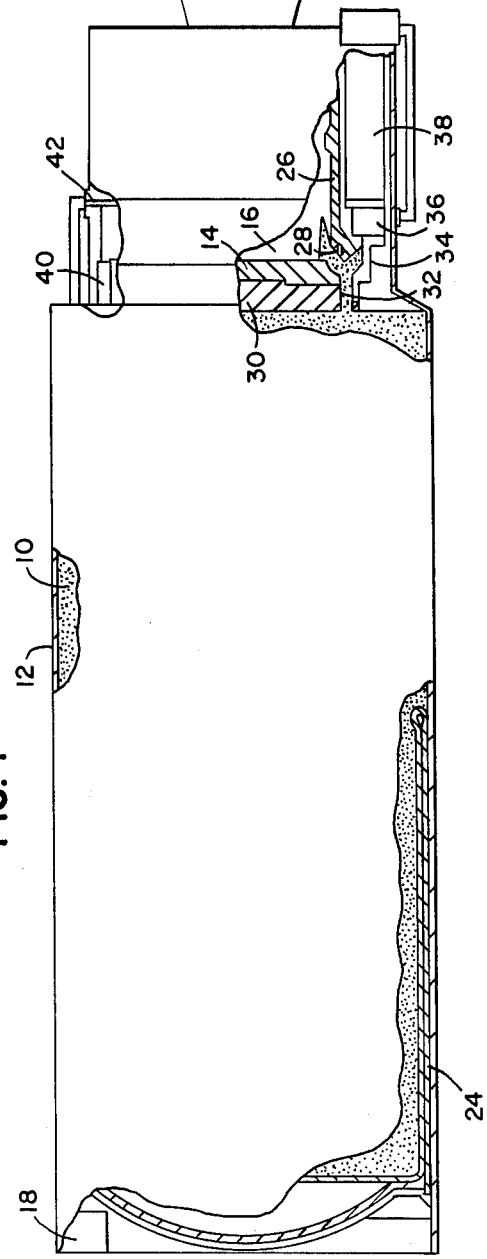
FIG. 1 is a side evevation, partially cut away, of a missile propulsion system.

As seen in FIG. 1 a pressurized putty-like propellant 10 is carried in a propellant storage chamber 12. The propellant is forced through a moving injector 14 into a combustion chamber 16.

Figure 3:
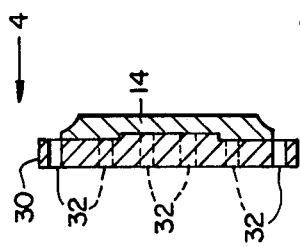
FIG. 3 is a side view of the injector and web showing the multiple openings.
Figure 2:
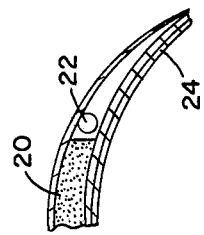
FIG. 2 is an end view of the warm gas generator.
Figure 4:
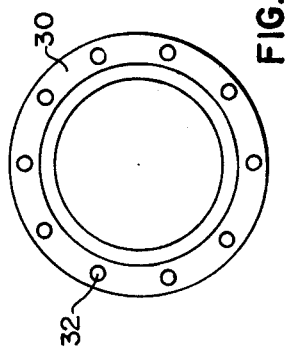
FIG. 4 is an end view of the web shown in FIG. 3.

FIG. 2 shows a warm gas generator igniter 18, a warm gas generator 20, warm gas feed 22 and a roll seal 24 for pressurizing the propellant. A seat 26 is provided with a resilient rubber flow seal 28 for cooperation with injector 14. The injector is supported on a metal web 30 which has large openings 32 that allow the propellant to pass from the storage area into the injector. The metal web is supported for movement with an annular hydraulic piston 34 which is actuated by oil 36. A hydraulic system reservoir 38 is used to cause movement of piston 34.

In operation the igniter 18 ignites the warm gas generator 20 to pressurize the propellant. The propellant is squeezed through injector 14 into chamber 16 where the propellant cross section becomes wedgeshaped due to propellant burning.

The clearance between the seat 26 and the injector 14 is varied to modulate the propellant flow for command throttling of the missile. For shut off, the injector is completely closed with leakage prevented by the injector seating on seal 28. When closed a very small gap in the nature of less than 0.010 inches exists between the injector and the seat. Remaining propellant will not burn in the gap because of heat conduction to the injector and seat. The injector face and seat also have a double angle to serve as a radiation shield.

The warm gas generator also pressurizes the hydraulic system reservoir 38 which pressurizes the oil 36 which causes rearward motion of the piston 34 and injector 14 to allow propellant flow into the combustion chamber. Forward motion is obtained by controlled venting of the oil cavity allowing the propellant pressure to move the injector.

Reference numeral 40 identifies a potentiometer which indicates the position of the injector.

Warm gas generator exhaust is dumped into the combustion chamber 16 through inlet 42 to provide soft ignition of the propellant during the initial operation and restarts.

We claim:

1. A control system for supplying uncured putty-like propellant into a missile combustion chamber comprising: a propellant storage chamber; means for pressurizing propellant in said chamber; said pressurizing means including a warm gas generator, an igniter for igniting said generator and a roll seal which acts on said propellant when actuated by gas from said generator; a movable injector; a metal web supporting said movable injector; said web being provided with propellant discharge openings therein; a seat provided with a rubber flow seal; said web being disposed between said propellant storage chamber and said combustion chamber for cooperation with said rubber flow seal to control the propellant flow between the injector and the seat; said injector and said seat provided with a double angle therebetween to serve as a radiation shield; an annular piston connected to said metal web and a hydraulic system to actuate said piston to move said web and injector in a forward or rearward direction.

* * * * *